(12) United States Patent
Oya et al.

(10) Patent No.: US 10,123,091 B2
(45) Date of Patent: Nov. 6, 2018

(54) PLAYBACK MANAGEMENT DEVICE, PLAYBACK MANAGEMENT METHOD, PLAYBACK MANAGEMENT PROGRAM, CONTENT RECEIVING SYSTEM, AND CONTENT DISTRIBUTION SYSTEM

(71) Applicant: Smart Mobile Broadcasting Technology, Inc., Taipei (TW)

(72) Inventors: Tomoyuki Oya, Taipei (TW); Toshimi Morizumi, Taipei (TW); Yuri Seki, Taipei (TW)

(73) Assignee: SMART MOBILE BROADCASTING TECHNOLOGY, INC., Taipei (TW)

( * ) Notice: Subject to any disclaimer, the term of this patent is extended or adjusted under 35 U.S.C. 154(b) by 0 days.

(21) Appl. No.: 15/664,389

(22) Filed: Jul. 31, 2017

(65) Prior Publication Data

US 2018/0063597 A1    Mar. 1, 2018

(30) Foreign Application Priority Data

Aug. 26, 2016 (TW) .............................. 105127408 A

(51) Int. Cl.
*H04N 21/6379* (2011.01)
*H04N 21/2387* (2011.01)
*H04N 21/418* (2011.01)

(52) U.S. Cl.
CPC ..... *H04N 21/6379* (2013.01); *H04N 21/2387* (2013.01); *H04N 21/4181* (2013.01)

(58) Field of Classification Search
CPC ........... H04N 21/6379; H04N 21/2387; H04N 21/4181; H04N 21/40
See application file for complete search history.

(56) References Cited

U.S. PATENT DOCUMENTS 6,834,346 B1 * 12/2004 Ishibashi ................. G06F 21/10
   380/278
8,640,249 B2 * 1/2014 Park ....................... H04N 7/163
   380/201

FOREIGN PATENT DOCUMENTS

JP    1999308595 A    11/1999
WO   2013146865 A1   10/2013

* cited by examiner

*Primary Examiner* — Oleg Asanbayev
(74) *Attorney, Agent, or Firm* — Locke Lord LLP; Tim Tingkang Xia, Esq.

(57) ABSTRACT

A playback management device (3) is provided for use with a receiver (2) for receiving a content signal encoded by a key (Ks) updated in a specified update period and first control information (ECM) obtained by encoding information about the key (Ks) and a playable time (Tpre) for the encoded content signal. The playback management device (3) includes: an interface (31) for collecting the first control information (ECM) from the receiver; a first decoding portion (34) for decoding the first control information (ECM) and thereby restoring the key (Ks) and the playable time (Tpre) for the encoded content signal; and a control portion (35) for determining, according to the playable time (Tpre) for the encoded content signal and the update period (Tud) for the key (Ks), whether to output the key (Ks) to the receiver (2), and outputting the restored key (Ks) to the receiver (2) when determining to output.

5 Claims, 6 Drawing Sheets

PLAYBACK MANAGEMENT DEVICE, PLAYBACK MANAGEMENT METHOD, PLAYBACK MANAGEMENT PROGRAM, CONTENT RECEIVING SYSTEM, AND CONTENT DISTRIBUTION SYSTEM

CROSS-REFERENCE TO RELATED PATENT APPLICATION

This application claims the benefit of priority to Taiwan Patent Application No. 105127408, filed Aug. 26, 2016. The entire content of the above identified application is incorporated herein by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD

The present invention relates to a playback management device, a playback management method, a playback management program, a content receiving system, and a content distribution system with a view to effectuating playback management of encoded contents.

BACKGROUND

It is a current trend to distribute content signals from broadcast stations and then play the content signals with an electronic machine, such as a smartphone, a personal computer, and a TV set. The content signals are encoded and distributed so as to protect distribution-related interests of a content distributor engaged in a paid broadcast service. In this regard, only those users which entered into a contract with the content distributor can decode the content signals and thereby watch the contents.

In the situation where content signals are encoded and distributed, typical measures taken to increase subscribers involve allowing viewers who have not entered into a contract with the content distributor to watch the contents for a short period of time, that is, see previews of the contents. To effectuate a preview, it is necessary to output a key which decodes encoded content signals for a specified period of preview time.

PRIOR ART DOCUMENT

Citation Document

[Citation 1] Japanese Unexamined Patent Application Publication No. 2011-216941.
[Citation 2] Japanese Unexamined Patent Application Publication No. 11-308595.

SUMMARY

Problem

When a decoding key is output inadvertently, there is a high probability that the decoding key will be improperly used. To perform time management correctly, it is necessary to provide a tamper-resistant time source with a high cost.

In view of the aforesaid drawback of the prior art, it is the objective of the present invention to provide a playback management device, a playback management method, a playback management program, a content receiving system, and a content distribution system with a view to effectuating a preview with a high degree of security and a low cost.

Solution

The present invention provides, in an embodiment thereof, a playback management device for use with a receiver for receiving a content signal encoded by a key updated in a fixed update period and first control information obtained by encoding information about the key and a playable time for the encoded content signal, wherein the playback management device comprises: a memory portion for storing the fixed update period in advance; an interface for collecting the first control information from the receiver; a first decoding portion for decoding the first control information and thereby restoring the key and the playable time for the encoded content signal; and a control portion for determining, according to the playable time for the encoded content signal and the fixed update period stored in the memory portion, whether to output the key to the receiver, and outputting the restored key to the receiver when determining to output.

The playable time can be a period of time for which the encoded content signal is played without a contract of playing the encoded content signal. That is, the playable time can be a preview time.

The control portion outputs the key for a number of times corresponding to a ratio of the playable time to the fixed update period.

The playback management device is an IC chip or an IC card inserted into the receiver.

The present invention provides, in an embodiment thereof, a content receiving system, comprising: the playback management device; and a receiver for receiving the encoded content signal and the first control information; wherein when the receiver forwards the first control information to the playback management device and collects the key from the playback management device, the receiver uses the key to decode the encoded content signal.

The present invention provides, in an embodiment thereof, a playback management method, comprising steps performed by a playback management device for use with a receiver, the receiver being adapted to receive a content signal encoded by a key updated in a fixed update period and first control information obtained by encoding information about the key and a playable time for the encoded content signal, the playback management method comprising the steps of: collecting the first control information from the receiver; decoding the first control information and restoring information about the key and the playable time for the encoded content signal; determining, according to the playable time for the encoded content signal and the fixed update period stored in a memory portion of the playback management device, whether to output the key to the receiver; and outputting the restored key to the receiver when determining to output.

The present invention provides, in an embodiment thereof, a playback management program, making a playback management device be used with a receiver to function as means described below, the receiver being adapted to receive a content signal encoded by a key updated in a fixed update period and first control information obtained by encoding information about the key and a playable time for the encoded content signal, means for collecting the first control information from the receiver; means for decoding the first control information and restoring information about the key and the playable time for the encoded content signal; means for determining, according to the playable time for the encoded content signal and the fixed update period stored in a memory portion of the playback management device, whether to output the key to the receiver; and means for outputting the restored key to the receiver when determining to output.

The present invention provides, in an embodiment thereof, a content distribution system, comprising: a broadcast device; a receiver; an IC card inserted into the receiver; and a playback device not having a tuner for processing a broadcast wave from the broadcast device, wherein the broadcast device has: a first encoding portion (11) for encoding a content signal by a first key (Ks) updated in a fixed update period (Tud) to generate an encoded content signal; a second encoding portion (12) for encoding, by a second key (Kw), the first key (Ks) and information about a playable time (Tpre) for the first key (Ks) to generate first control information entitlement control message (ECM); and a third encoding portion (14) for encoding the second key (Kw) by a third key (Km) intrinsically configured in the IC card to generate second control information entitlement management message (EMM); wherein the encoded content signal, the first control information ECM and the second control information EMM are transmitted to the receiver by a broadcast wave, wherein the receiver has: a tuner (21) for processing the encoded content signal and the first control information ECM; and a first decoding portion (22) for decoding, when the IC card outputs the first key (Ks), the encoded content signal and thereby restoring the content signal; wherein the restored content signal is played by the playback device, wherein the IC card offers more security than the receiver, and the IC card has: a memory portion for storing data about the update period in advance; a second decoding portion (32) for receiving the second control information EMM through the receiver, decoding the second control information EMM by the third key (Km) of the IC card, and thereby restoring the second key (Kw); a third decoding portion (34) for receiving the first control information ECM through the receiver, decoding the first control information ECM by the restored second key (Kw), and thereby restoring the first key (Ks) and the playable time for the first key (Ks); and a control portion (35) for outputting the first key (Ks) for a number of times corresponding to a ratio of the playable time (Tpre) to the update period (Tud) stored in the memory portion in advance.

Advantage of the Invention

The playback management device of the present invention determines whether to output a key, thereby attaining a high degree of security and effectuating a preview at a low cost.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, and wherein.

DETAILED DESCRIPTION

The embodiment of the present invention is hereunder illustrated by drawings and described in detail.

Figure 1:
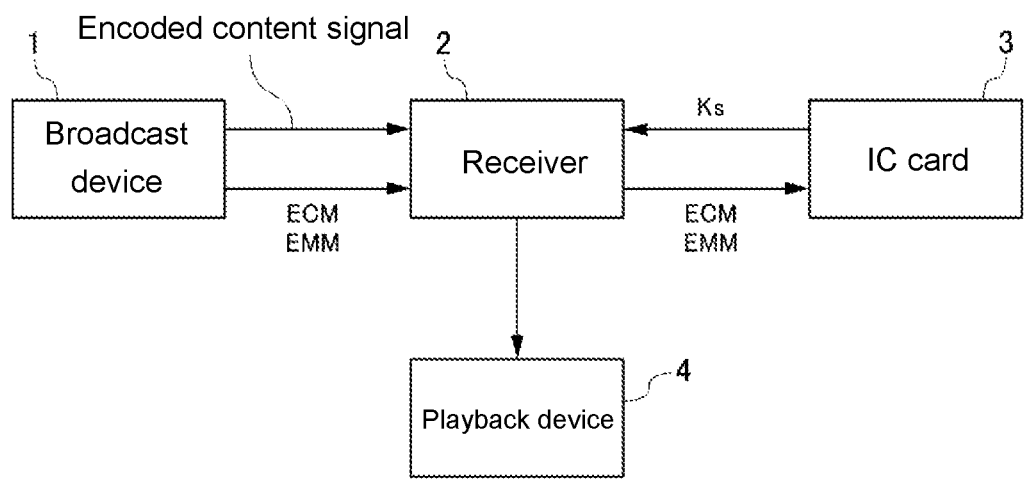
FIG. 1 is a block diagram of a schematic structure of a content distribution system according to an embodiment of the present invention.

FIG. 1 is a block diagram of a schematic structure of a content distribution system according to an embodiment of the present invention. The content distribution system comprises a broadcast device 1, a receiver 2, an IC card (playback management device) 3, and a playback device 4. The diagram shows one receiver 2, one IC card 3, and one playback device 4; however, they are usually provided in a plural number, so is the broadcast device 1. The receiver 2 and the IC card 3 together constitute a content receiving system.

The broadcast device 1 is, for example, provided in a broadcast station to transmit, by a broadcast wave, an encoded content signal as well as control information ECM (entitlement control message), EMM (entitlement management message) to be described later.

The receiver 2 is operated by a user and receives the content signal and the control information ECM, EMM and forwards the control information ECM, EMM to the IC card 3.

The user inserts the IC card 3 into the receiver 2 to transmit to the receiver 2, when a specified criterion is met, a key Ks (scrambling key) for decoding the encoded content signal. As soon as the receiver 2 receives the key Ks, the encoded content signal is decoded by the key Ks. The decoded content signal is played by the playback device 4.

In an embodiment, the receiver 2 is a dongle, whereas the playback device 4 is a smartphone connected to the dongle. Given the aforesaid structure, even though the smartphone is not equipped with any tuner and thus is unable to process a broadcast wave, the user may still use the smartphone to receive content signals. In an embodiment, the receiver 2 is a set top box, whereas the playback device 4 is a display unit connected to the set top box by an HDMI® cable. Alternatively, the receiver 2 is built in the playback device 4. Alternatively, a playback management device equivalent to the IC card 3 functions as an IC chip and is mounted inside the receiver 2.

The IC card 3 must be a high-security module which offers more security than the receiver 2 and thus is effective in stopping improper access from the outside. To this end, the either IC card 3 only needs to be tamper-resistance, or the playback management device equivalent to the IC card 3 is mounted within a tamper-resistance area of a portion of a universal processor.

The present invention is hereunder described in detail. A contract must be specified in order for the encoded content signal to be played. However, a preview effectuated without a contract is described below.

Figure 2:
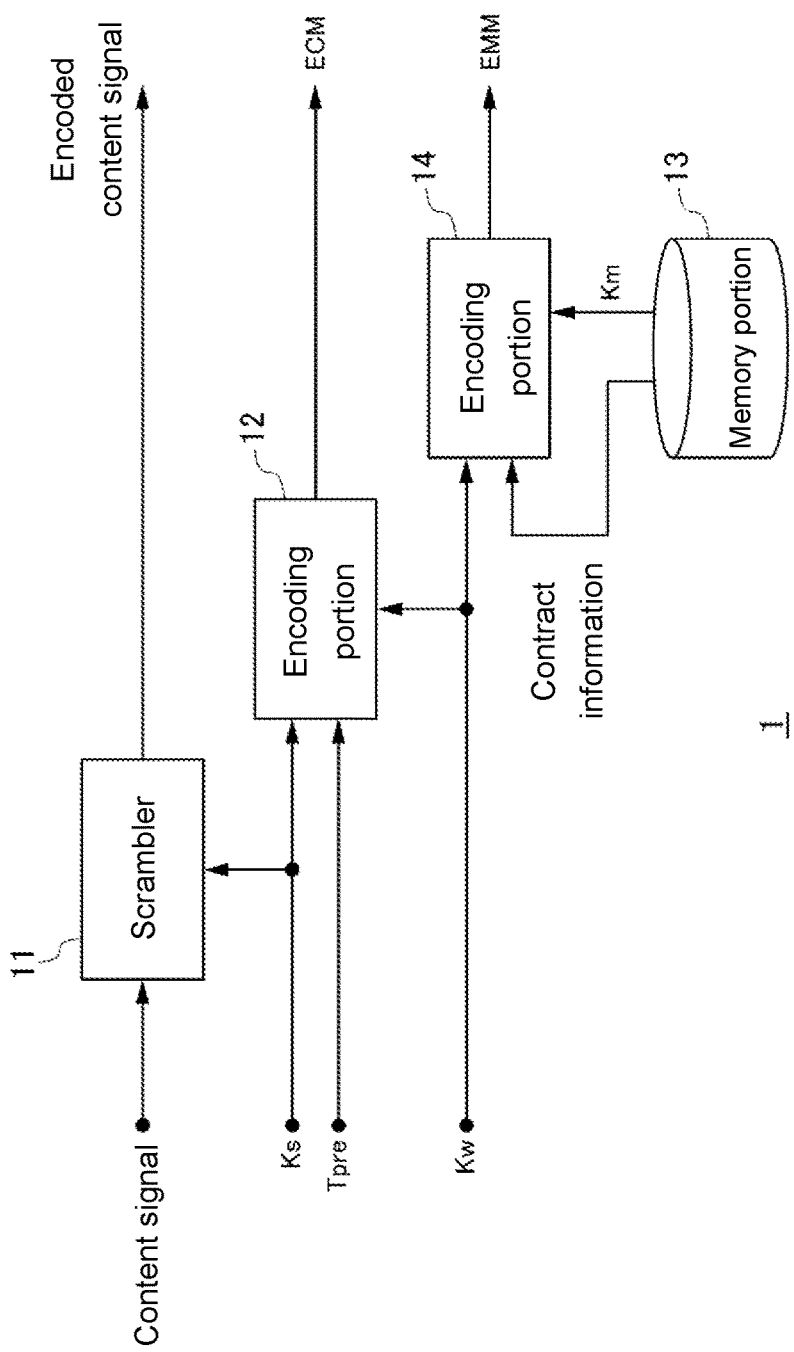
FIG. 2 is a block diagram of an internal structure of a broadcast device 1 according to the embodiment of the present invention.

FIG. 2 is a block diagram of the broadcast device 1 according to the embodiment of the present invention. The broadcast device 1 has a scrambler 11 (encoding portion), an encoding portion 12, a memory portion 13, and an encoding portion 14.

The scrambler 11 scrambles (encodes) a content signal by a key Ks. The content signal is, for example, a video signal and an audio signal. The encoded content signal thus generated will not be played unless by the key Ks. The key Ks is in the possession of the broadcast device 1. At a receiving end, the receivers 2 are not different and neither are the content signals. The key Ks is updated in a specified update period Tud. Alternatively, the update period Tud is set by the broadcast device 1 or is a predetermined fixed value.

The encoding portion 12 uses a key Kw (operating key) to encode information about the key Ks and the preview time Tpre and thereby generate control information ECM. At the preview time Tpre a content signal is played without a contract of playing the content signal, and the preview time Tpre is predetermined according to the content signal. Therefore, the control information ECM varies with each content signal.

The memory portion 13 stores a key Km (main key) corresponding to each IC card 3. Hence, each IC card 3 has the intrinsically configured key Km, and the memory portion 13 "remembers" which IC card 3 has which key Km. The memory portion 13 also stores data about contract information related to the users of the IC cards 3. The contract information shows whether a contract of playing the encoded content signal has been entered into.

Like the memory portion 13, the encoding portion 14 uses the key Km of the IC card 3 of a target of transmission to encode the key Kw and the contract information and thereby generate the control information EMM for use by the specific IC card 3.

The encoded content signal and the control information ECM, EMM are transmitted from the broadcast device 1 to the receiver 2 by a broadcast wave. The encoded content signal and the control information ECM are transmitted together, whereas the control information EMM can be transmitted at any time, for example, at a point in time when the contract information is changed. The control information EMM is for use by the receiver 2 which the specific IC card 3 is inserted into; hence, the control information EMM may also be transmitted by a means for providing communication to therefore save the bandwidth for transmission of the broadcast wave.

Figure 3:
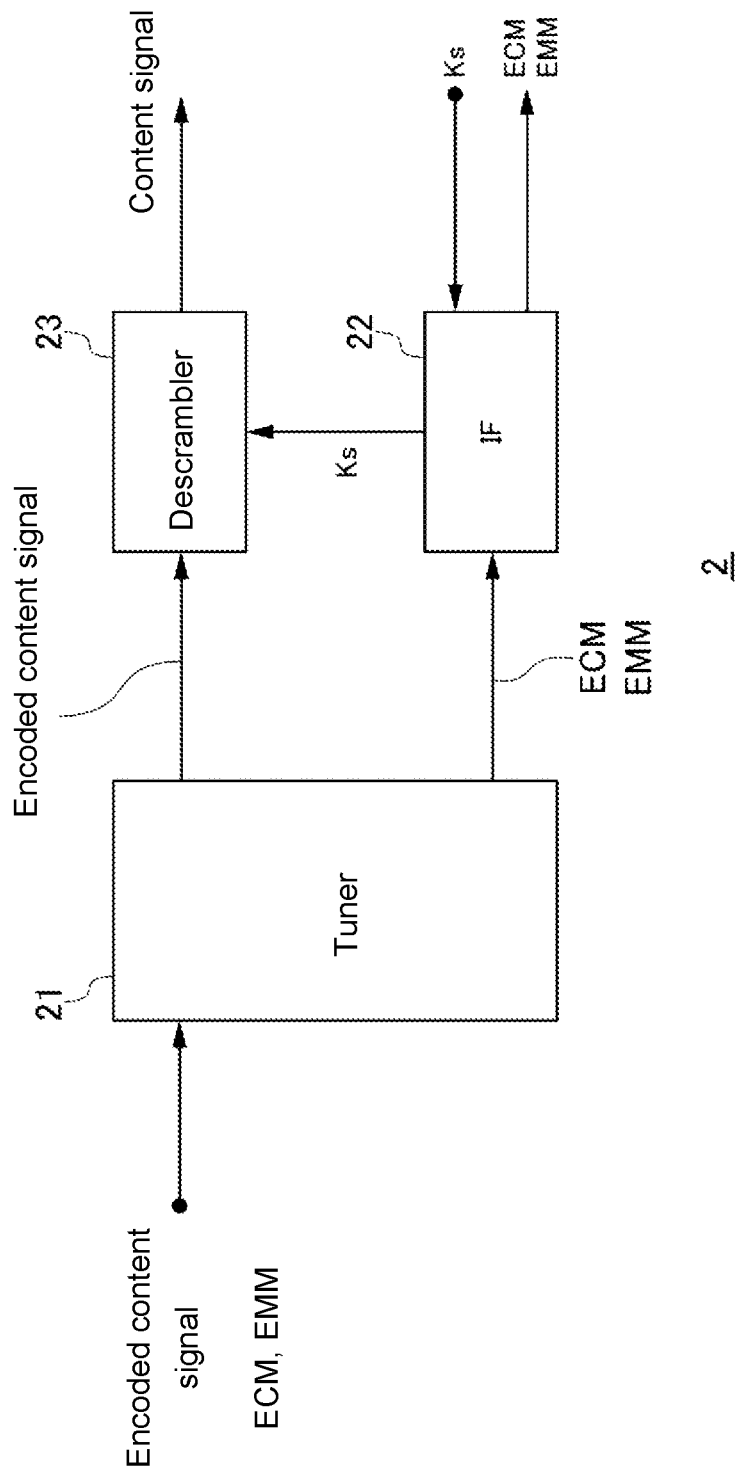
FIG. 3 is a block diagram of an internal structure of a receiver 2 according to the embodiment of the present invention.

FIG. 3 is a block diagram of the receiver 2 according to the embodiment of the present invention. The receiver 2 has a tuner 21, an interface (IF) 22 in communication with the IC card 3, and a descrambler 23 (decoding portion).

The tuner 21 receives the encoded content signal and the control information ECM, EMM from the broadcast wave and chooses a channel according to the users' setting. The encoded content signal is supplied to the descrambler 23, whereas the control information ECM, EMM is supplied to the interface 22.

The interface 22 forwards to the IC card 3 the control information ECM, EMM received from the broadcast device 1. The interface 22 collects the key Ks output from the IC card 3 and forwards the key Ks to the descrambler 23.

The descrambler 23 uses the key Ks to descramble (decode) the encoded content signal. That is to say, the descrambler 23 decodes the encoded content signal when the IC card 3 has output the key Ks. However, the descrambler 23 cannot descramble the encoded content signal when the IC card 3 has not output the key Ks. The descrambled content signal is converted into a video signal and/or an audio signal to be output to the playback device 4.

The receiver 2 will not be required to be capable of communication, provided that the control information EMM is transmitted by a broadcast wave.

Figure 4:
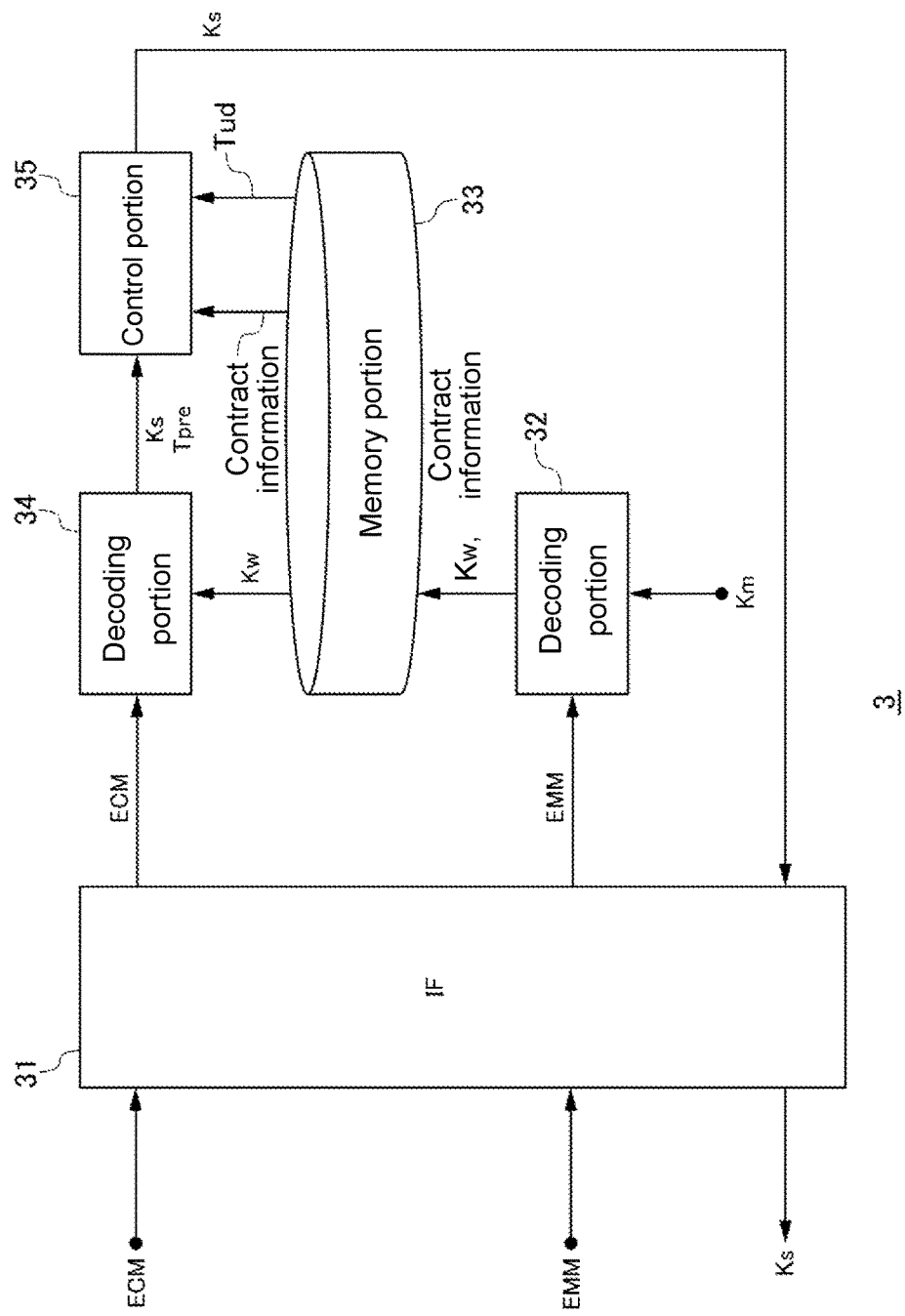
FIG. 4 is a block diagram of an internal structure of an IC card 3 according to the embodiment of the present invention.

FIG. 4 is a block diagram of the IC card 3 according to the embodiment of the present invention. The IC card 3 has an interface (IF) 31 in communication with the receiver 2, a decoding portion 32, a memory portion 33, a decoding portion 34, and a control portion 35. The IC card 3 is, for example, inserted into the receiver 2 to receive electric power from the receiver 2 in order to operate.

The interface 31 collects the control information ECM, EMM from the receiver 2. The interface 31 delivers the key Ks to the receiver 2 under a specified condition.

The decoding portion 32 decodes the control information EMM with the intrinsically configured key Km of the IC card 3 and thereby restores the key Kw and the contract information. Data about the key Kw and the contract information is stored in the memory portion 33. With the key Km being in the possession of the IC card 3, the decoding portion 32 can decode the control information EMM within its reach, but cannot decode the control information EMM attributed to the other IC cards 3.

In addition to the key Kw and the contract information, the memory portion 33 stores data about the update period Tud for the key Ks. When the update period Tud is a fixed value, data about the update period Tud is preconfigured and stored in the memory portion 33.

The decoding portion 34 decodes the control information ECM with the key Kw and thereby restores the key Ks and the preview time Tpre.

The control portion 35 determines whether to output the key Ks to the receiver 2 according to the contract information, the preview time Tpre, and the update period Tud for the key Ks. If the contract information shows that a contract of playing the encoded content signal has been entered into, the control portion 35 will determine that the key Ks has to be output. If the contract information shows that the contract has not been entered into, the control portion 35 will effectuate a preview according to the preview time Tpre and the update period Tud. Concretely, the control portion 35 determines that the key Ks has to be output, and the key Ks is output for a number of times equal to a ratio of the preview time Tpre to the update period Tud. When the control portion 35 determines that the key Ks has to be output, the control portion 35 outputs the key Ks to the receiver 2 through the interface 31. The judgment made by the control portion 35 in a preview is described in detail below.

Figure 5:
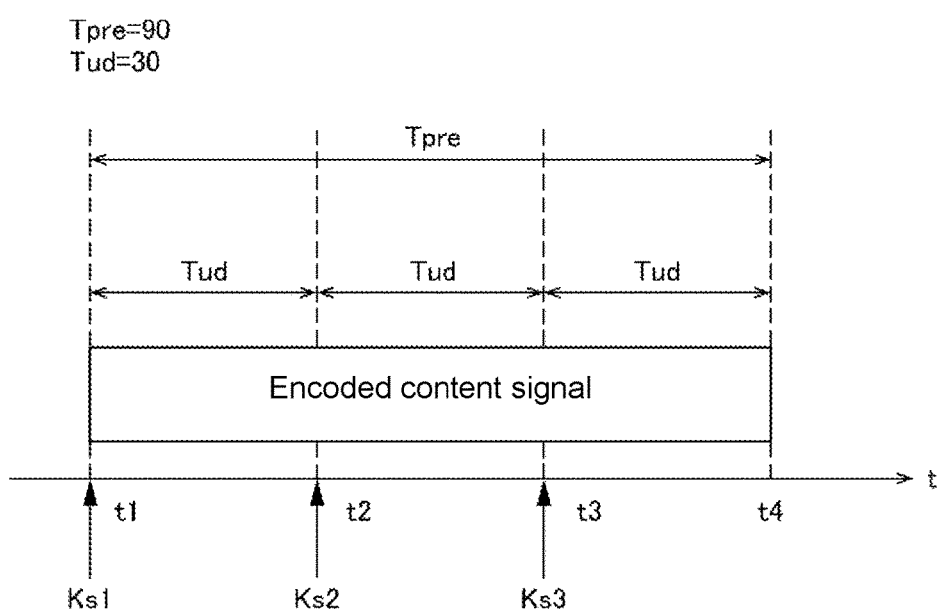
FIG. 5 is a schematic view of how to output a key Ks from a control portion 35 of the IC card 3.

FIG. 5 is a schematic view of how to output the key Ks from the control portion 35 of the IC card 3. Unless otherwise specified, the description below ignores delays caused by decoding and data receiving/transmitting. Referring to FIG. 5, given a preview time Tpre is 90 seconds and the update period Tud for the key Ks is 30 seconds. Hence, the key Ks is updated thrice within the preview time Tpre, as Tpre/Tud=3. The key Ks to be updated successively are keys Ks1, Ks2, Ks3.

Referring to FIG. 5, at time t1, the receiver 2 received the encoded content signal and the control information ECM, and no key Ks has been output.

Therefore, at time t1, the control portion 35 outputs the key Ks1 (first output). By this means, for the update period Tud of 30 seconds, which starts from time t1 and ends at time t2, the descrambler 23 of the receiver 2 can use the key Ks1 to decode the encoded content signal. After time t2, since the key Ks has been updated, the descrambler 23 cannot use the key Ks1 to decode the encoded content signal.

At time t2, the control portion 35 receives the control information ECM obtained by encoding the updated and new key Ks2. In consequence, the key Ks has been output only once. Hence, the control portion 35 outputs the key Ks to the receiver 2 (second output). By this means, for the update period Tud of 30 seconds, which starts from time t2 and ends at time t3, the descrambler 23 of the receiver 2 can use the key Ks2 to decode the encoded content signal. After time t3, since the key Ks has been updated, the descrambler 23 cannot use the key Ks2 to decode the encoded content signal.

At time t3, the control portion 35 receives the control information ECM obtained by encoding the updated and new key Ks3. In consequence, the key Ks has been output only twice. Hence, the control portion 35 outputs the key Ks to the receiver 2 (third output). By this means, for the update period Tud of 30 seconds, which starts from time t3 and ends at time t4, the descrambler 23 of the receiver 2 can use the key Ks3 to decode the encoded content signal. After time t4, since the key Ks has been updated, the descrambler 23 cannot use the key Ks3 to decode the encoded content signal.

At time t4, the control portion 35 receives control information obtained by encoding the updated and new key Ks. Since, by time t4, the control portion 35 has output the key Ks thrice, the control portion 35 will no longer transmit the key Ks to the receiver 2. Therefore, after time t4, the descrambler 23 cannot decode the encoded content signal.

Accordingly, the encoded content signal is decoded and played for the 90 second preview time Tpre.

Figure 6:
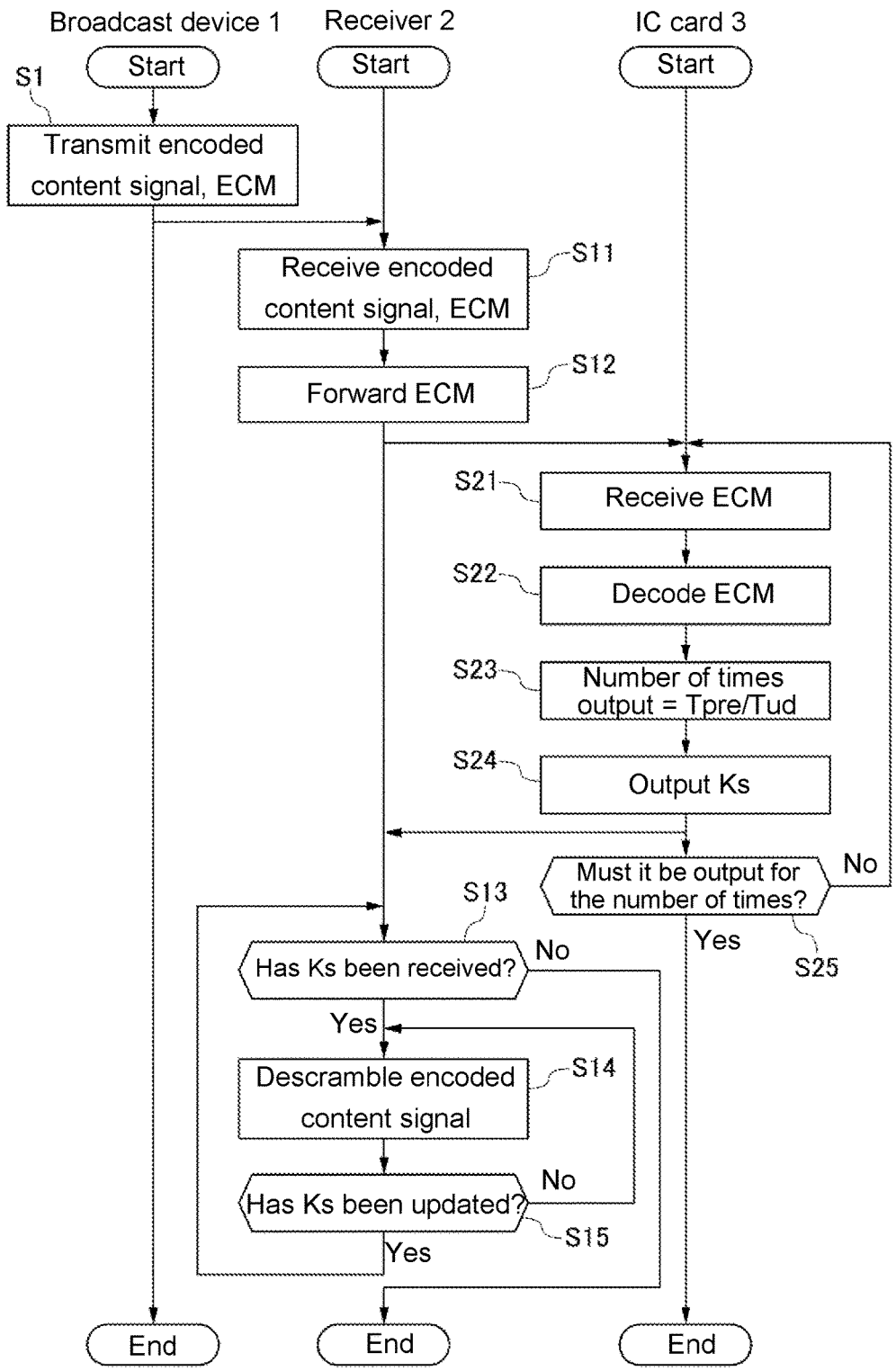
FIG. 6 is a schematic view of the process flow of operation of the content distribution system according to the embodiment of the present invention.

FIG. 6 is a schematic view of the process flow of operation of the content distribution system according to the embodiment of the present invention. The control information EMM has been transmitted to the receiver 2, and the memory portion 33 stores data about the key Kw. No contract of playing the encoded content signal was entered into.

The broadcast device 1 transmits the encoded content signal and the control information ECM to the receiver 2 by a broadcast wave (step S1). The control information ECM includes information about the encoded key Ks and the preview time Tpre.

The receiver 2 receives the encoded content signal and the control information ECM (step S11) and forwards the control information ECM to the IC card 3 (step S12).

The IC card 3 receives the control information ECM (step S21). Afterward, the decoding portion 34 of the IC card 3 uses the key Kw to decode the control information ECM (step S22) and thereby restore the key Ks and the preview time Tpre. Then, the control portion 35 calculates the number N of times the key Ks is output according to the restored preview time Tpre and the update period Tud stored in the memory portion 33 (step S23). The control portion 35 sees Tpre/Tud as the number N of times. Afterward, the control portion 35 effectuates the first output of the key Ks (step S24).

The control portion 35 outputs the key Ks to the receiver 2 the number N of times and those outputs are done once every the update period Tud (step S21~S25). That is to say that when the actual number of times of outputting the key Ks has not reached N ("No" in step S25), the decoding portion 34 receives the control information ECM after lapse of the update period Tud from reception of a specific key Ks (for example, the key Ks1 of FIG. 5) (step S21), and the decoding portion 34 decodes the control information ECM including the updated key Ks (for example, the key Ks2 of FIG. 5) (step S22). Afterward, the control portion 35 outputs the restored key Ks to the receiver 2 (step S24).

When the descrambler 23 of the receiver 2 receives the key Ks (step S13), the descrambler 23 descrambles the encoded content signal (step S14). Before the key Ks is updated, that is, before lapse of the update period Tud, the descrambler 23 can descramble the encoded content signal ("No" in step S15).

In case the key Ks has been updated after lapse of the update period Tud ("Yes" in step S15), if the descrambler 23 receives the updated key Ks from the IC card 3 ("Yes" in step S13), the descrambler 23 will keep descrambling the encoded content signal (step S14). the key Ks is updated and If the updated key Ks is not transmitted from the IC card 3 ("No" in step S13), the descrambler 23 cannot descramble the encoded content signal.

In this embodiment, the IC card 3 is well informed of the update period Tud, and thus the high-security IC card 3 is able to determine whether to output the key Ks. Afterward, the IC card 3 will output the key Ks to the receiver 2 only if the key Ks is determined to be output, thereby enhancing security. Hence, the manufacturing cost of the receiver 2 is reduced because the receiver 2 neither needs a high degree of security nor needs to manage a preview time.

In this embodiment, the update period Tud is a fixed value, and the update period Tud is stored in the memory portion 33 in advance. However, this embodiment will also work, provided that the IC card 3 is well informed of the update period Tud. In addition to the fixed update period Tud, considerations are given to variant embodiments.

For instance, the encoding portion 14 of FIG. 2 may encode the key Kw and information about the update period Tud to generate the control information EMM. In this case, the decoding portion 32 of FIG. 4 may decode the control information EMM and thereby restore the update period Tud. The restored update period Tud is then stored in the memory portion 33.

For instance, the encoding portion 12 of FIG. 2 may encode information about the key Ks and preview time Tpre and information about the update period Tud to generate the control information ECM. In this case the decoding portion 34 of FIG. 4 may decode the control information ECM and thereby restores the update period Tud. The restored update period Tud is then stored in the memory portion 33.

For instance, the encoding portion 12 of FIG. 2 may encode information about the key Ks and preview time Tpre and time information to generate the control information ECM. The time information is, for example, about the time at which new key Ks is output from the broadcast device 1. Referring to FIG. 5, the encoding portion 12 generates control information ECM1 inclusive of key Ks1 and time information t1. Afterward, the encoding portion 12 generates control information ECM2 inclusive of key Ks2 and time information t2. In this case, the decoding portion 32 of FIG. 4 uses the time difference (t2−t1) between the time information t1 restored from the control information ECM1 and the time information t2 restored from the control information ECM2 as the update period Tud. Additionally, the decoding portion 32 of FIG. 4 stores the update period Tud in the memory portion 33.

At least a portion of the content distribution system in the aforesaid embodiments may be hardware or software. If it is software, a program executable to perform a function of at least a portion of the content distribution system can be stored in a record medium, such as a floppy disk or CD-ROM, so as to be read and executed by a computer. The record medium is not restricted to a magnetic disk or an optical disc, which is removable and replaceable, but may also include a fixed record medium, such as a hard disk drive device or memory.

Moreover, the program executable to perform a function of at least a portion of the content distribution system can be distributed by a communication network (including a wireless network), such as the Internet. Furthermore, The program may also be encoded, modulated, or compressed and be distributed by a wireless network or a wired network, such as the Internet, or by being stored in a record medium.

Given the above description, persons skilled in the art may think of a supplemental effect or various variations of the present invention. However, the present invention is not restricted to the aforesaid embodiments. Various supplements, changes, and partial deletions can be made to the present invention without departing from the scope and conceptual thoughts derived from technical features, and equivalents thereof, recited in the claims.

What is claimed is:

1. A playback management device for use with a receiver for receiving a content signal encoded by a key updated in a fixed update period and first control information obtained by encoding information about the key and a playable time for the encoded content signal, wherein the playback management device comprises:
    a memory portion for storing the fixed update period in advance;
    an interface for collecting the first control information from the receiver;
    a first decoding portion for decoding the first control information and thereby restoring the key and the playable time for the encoded content signal, wherein the playable time is a time period for which the encoded content signal is played without a contract of playing the encoded content signal; and
    a control portion for determining, according to the playable time for the encoded content signal and the fixed update period stored in the memory portion, whether to output the key to the receiver, and outputting the restored key to the receiver when determining to output, wherein the control portion outputs the key for a number of times corresponding to a ratio of the playable time to the fixed update period.

2. The playback management device of claim 1, wherein a security of the playback management device is higher than a security of the receiver.

3. The playback management device of claim 1, wherein the playback management device is an IC chip or an IC card inserted into the receiver.

4. A content receiving system, comprising:
    the playback management device of claim 1; and
    a receiver for receiving the encoded content signal and the first control information;
    wherein when the receiver forwards the first control information to the playback management device and collects the key from the playback management device, the receiver uses the key to decode the encoded content signal.

5. A playback management method, comprising steps performed by a playback management device for use with a receiver, the receiver being adapted to receive a content signal encoded by a key updated in a fixed update period and first control information obtained by encoding information about the key and a playable time for the encoded content signal, the playback management method comprising the steps of:
    collecting the first control information from the receiver;
    decoding the first control information and restoring information about the key and the playable time for the encoded content signal, wherein the playable time is a time period for which the encoded content signal is played without a contract of playing the encoded content signal;
    determining, by a control portion according to the playable time for the encoded content signal and the fixed update period stored in a memory portion of the playback management device, whether to output the key to the receiver; and
    outputting the restored key to the receiver when determining to output,
    wherein the control portion outputs the key for a number of times corresponding to a ratio of the playable time to the fixed update period.

* * * * *